S. GERMAN.
CORN HUSKING MACHINE.
APPLICATION FILED JULY 14, 1915.
1,176,359.
Patented Mar. 21, 1916.
5 SHEETS—SHEET 4.
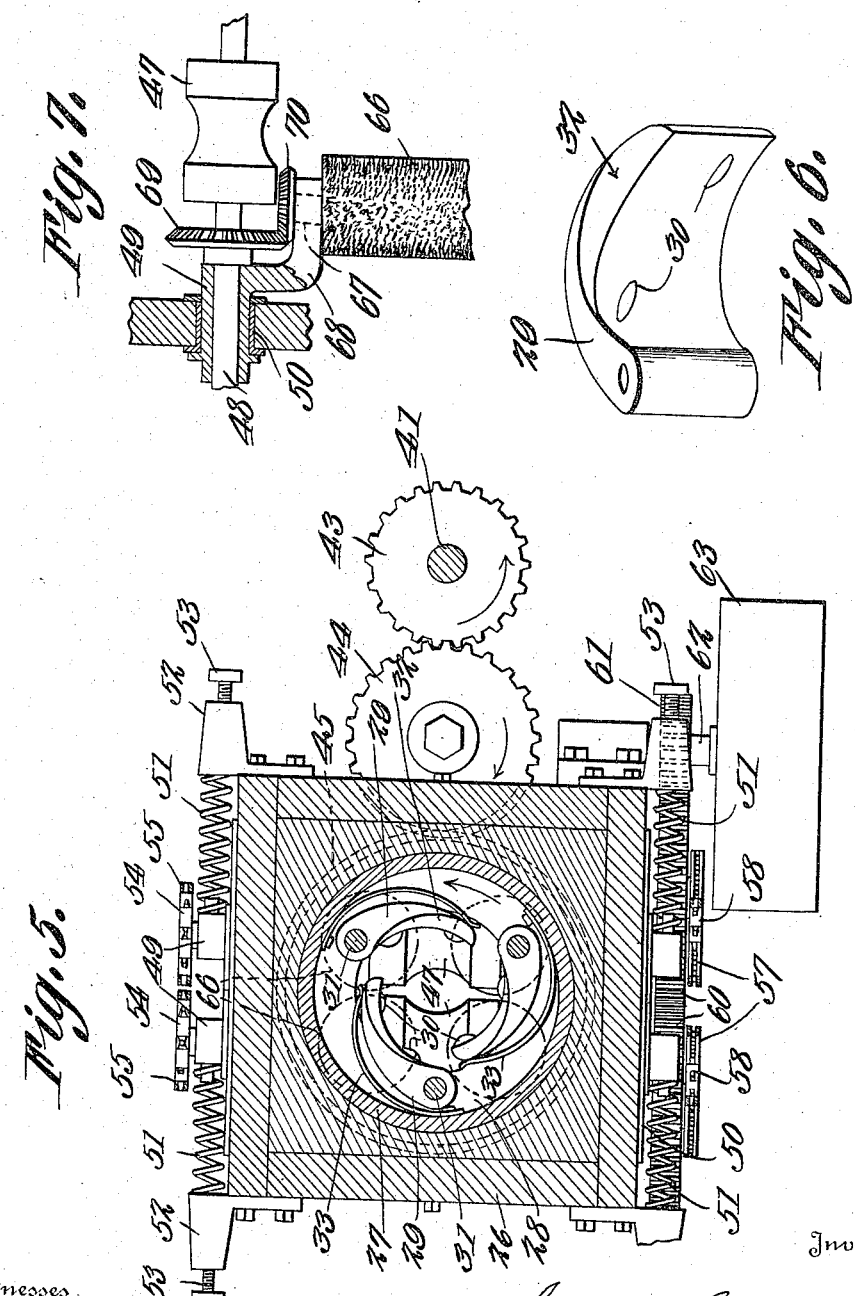

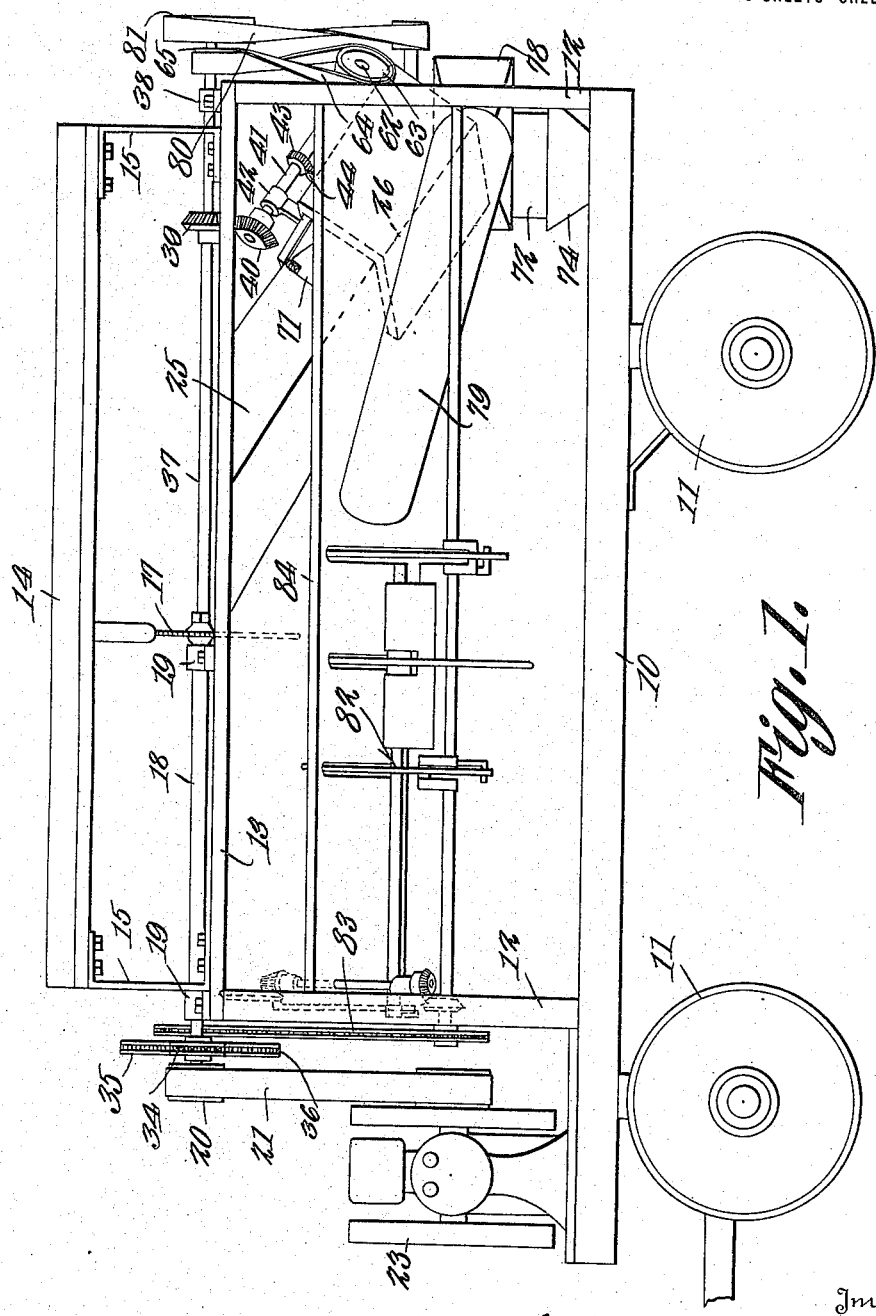

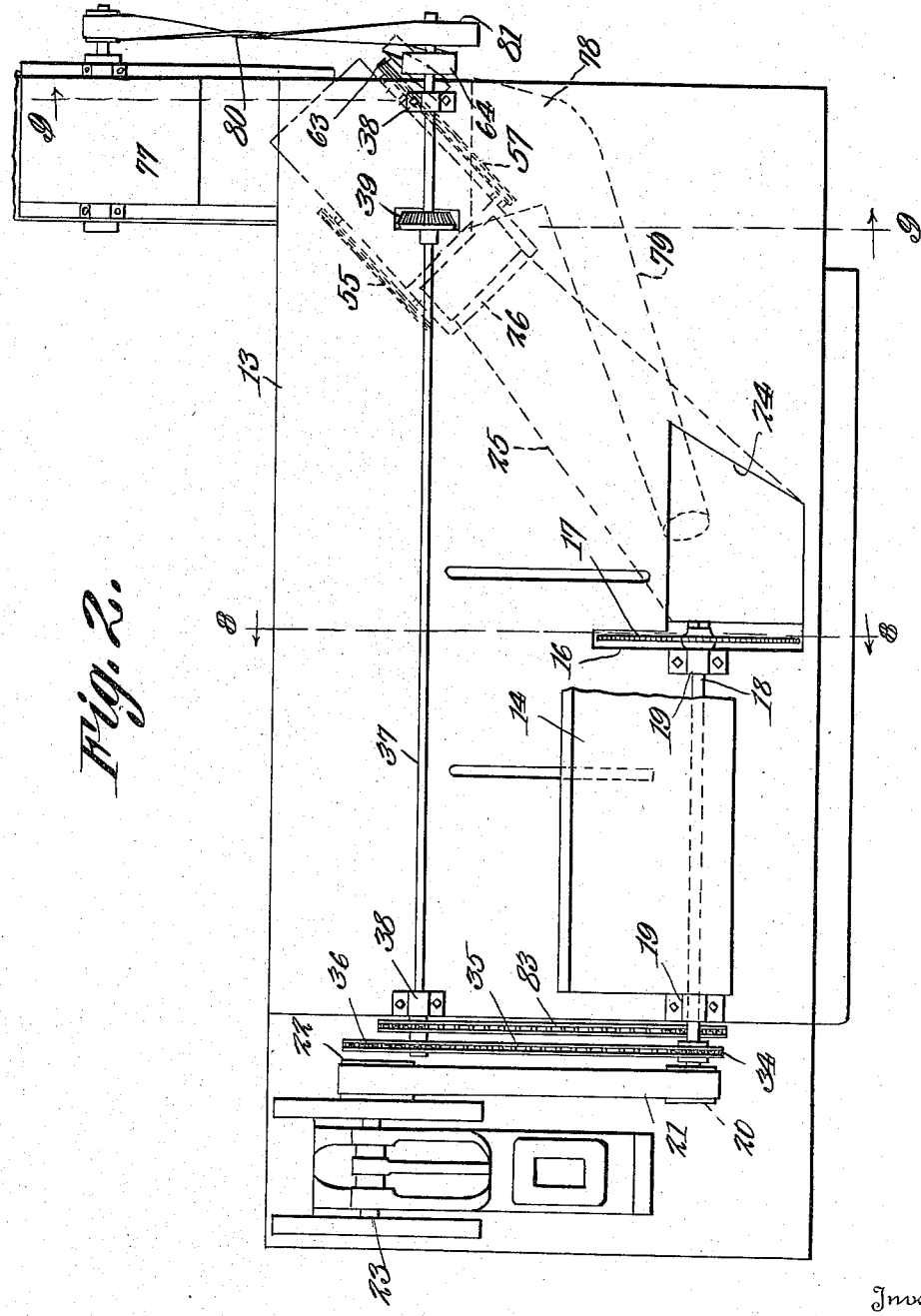

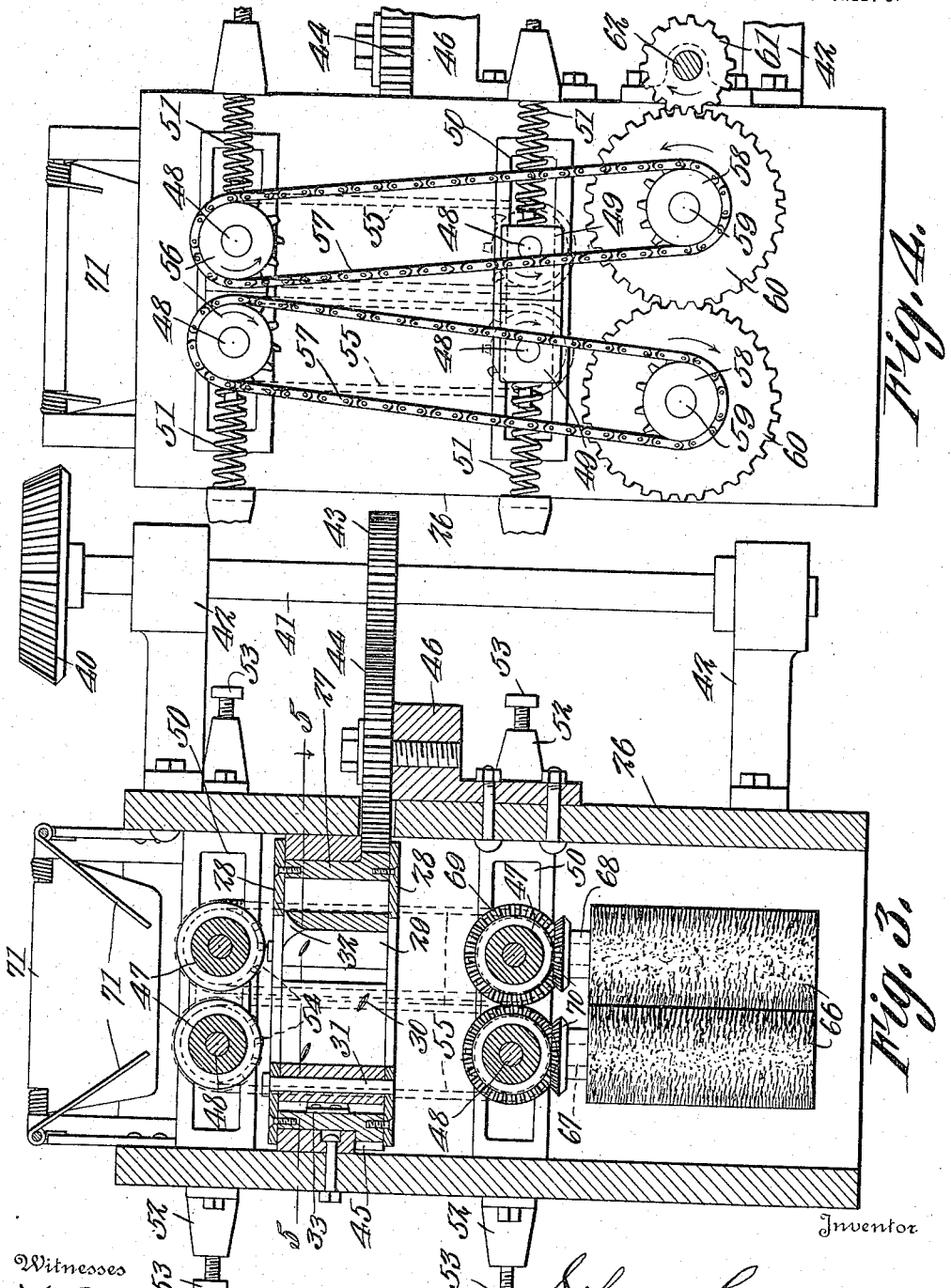

S. GERMAN.
CORN HUSKING MACHINE.
APPLICATION FILED JULY 14, 1915.

1,176,359.

Patented Mar. 21, 1916.
5 SHEETS—SHEET 5.

Witnesses
F. B. Wooded
E. Hatton Brewington

Inventor
Solomon German
By Henry S. Brewington
Attorney

THE COLUMBIA PLANOGRAPH CO., WASHINGTON, D. C.

UNITED STATES PATENT OFFICE.

SOLOMON GERMAN, OF JESSUPS, MARYLAND.

CORN-HUSKING MACHINE.

1,176,359.  Specification of Letters Patent.  Patented Mar. 21, 1916.

Application filed July 14, 1915. Serial No. 39,745.

*To all whom it may concern:*

Be it known that I, SOLOMON GERMAN, a citizen of the United States, residing at Jessups, in the county of Howard and State of Maryland, have invented certain new and useful Improvements in Corn-Husking Machines, of which the following is a specification.

This invention relates to machines for removing the husks from ears of corn, and its object is to provide a machine of this kind which is very efficient in operation, a novel and improved cutting mechanism being provided which cuts the husks in such a manner that they are readily stripped off the ears.

The herein stated object is attained by means of a combination and arrangement of parts to be hereinafter described and claimed, reference being had to the accompanying drawings in which—

Figure 8:
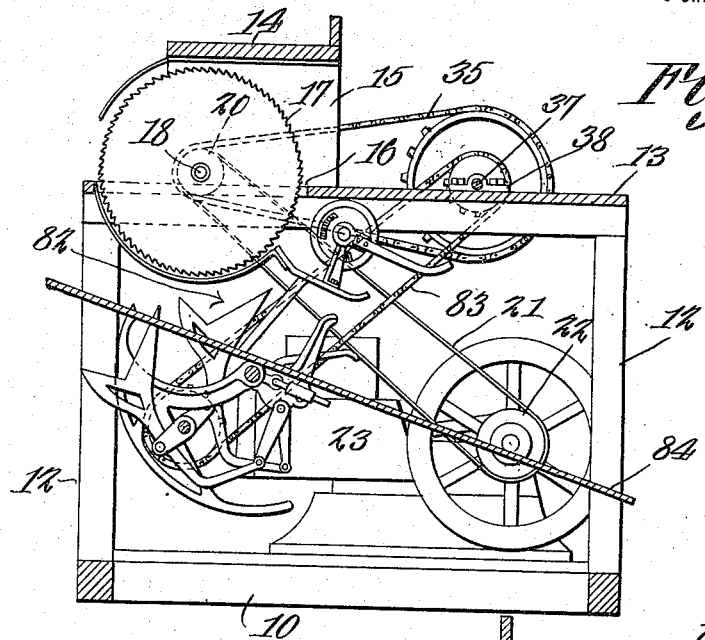
Figure 9:
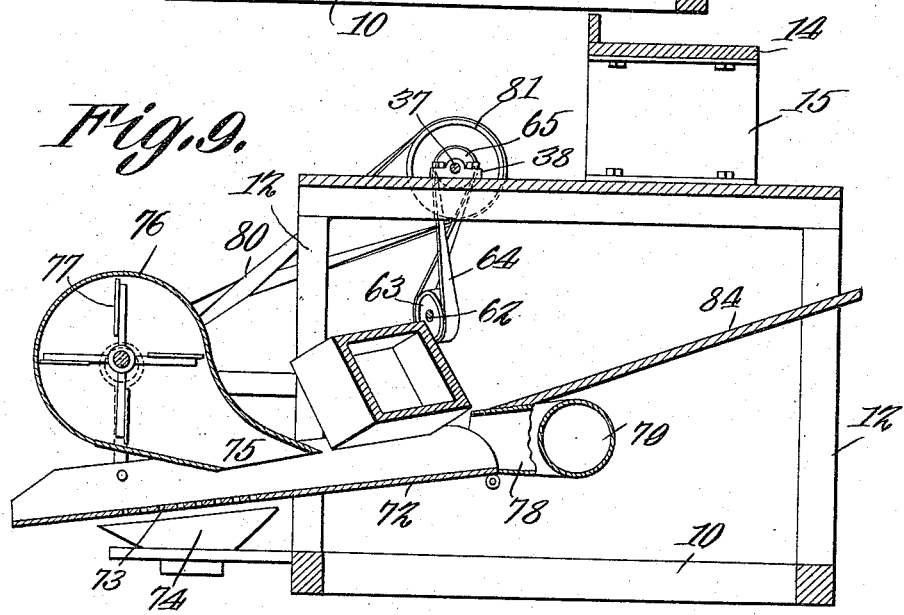

Figure 1 is a side elevation of the machine; Fig. 2 is a plan view thereof; Fig. 3 is a longitudinal section of the husk-cutting and stripping mechanism; Fig. 4 is an elevation of the housing inclosing said mechanism and certain drive gearing; Fig. 5 is a horizontal section on the line 5—5 of Fig. 4; Fig. 6 is a perspective view of one of the husk cutters; Fig. 7 is a detail illustrating the drive gearing of one of the stripper members; Fig. 8 is a cross-section on the line 8—8 of Fig. 2, and Fig. 9 is a cross-section on the line 9—9 of Fig. 2.

Referring specifically to the drawings, 10 denotes a truck frame mounted on wheels 11. The machine is mounted on this truck, and is thus made portable, so that it can be conveniently hauled from place to place. Of course, the machine may be built stationary, but it is, preferably, made portable.

The truck frame 10 carries, adjacent to its front and rear ends, uprights or standards 12 rising to a suitable height and supporting at the top a table or platform 13, and on the latter is mounted another table 14, the same being supported a suitable distance above the table 13 by standards 15.

In the table 13 is an opening 16 in which works a rotary cutter in the form of a circular saw 17, the same being located beneath the table 14. The cutter is on a shaft 18 supported in bearings 19 mounted on the table 13. The shaft 18 projects from the front end of the table 13 and has on said projecting end a pulley 20 which is connected by a belt 21 to a pulley 22 on the drive shaft of a motor 23, which latter may be an internal-combustion engine mounted on the truck frame 10. Any other suitable driving means for the saw shaft 18 may be provided.

On one side of the saw 17, the table 13 has an opening 24 below which is located an inclined chute 25 leading to a husking mechanism comprising the following parts: In a housing 26, suitably supported in fixed position on the truck frame 10, is mounted a hollow rotary cutter consisting of a cylinder 27 having fixed to its ends rings 28 carrying shanks 29 armed with knives 30. The shanks 29 are pivoted to the rings 28 by pins 31 connecting the latter. The rings 28 project over a sufficient distance from the inner periphery of the cylinder 27 to accommodate the pivot pins 31. The shanks 29 are thus pivotally mounted inside the cylinder 27 on an axis parallel to the longitudinal axis of the cylinder, in view of which they are free to swing transversely thereof. The shanks 29 have a width corresponding to the length of the cylinder 27 and they thus extend throughout the entire length of the latter. Each shank has two knives 30 located in different planes, and the knives of the respective shanks are in alinement. This arrangement produces two circular, longitudinally spaced rows of knives located in the cylinder. The edges of the shanks 29, at the entrance end of the cylinder, are beveled as indicated at 32, which provides a flared entrance for the ears and facilitates their entrance into circles of knives. The cylinder carries springs 33 which bear against the back of the shanks 29 and press the same outward. The shanks are curved, and they are set closely together so that their inner surfaces define a substantially cylindrical space into which the knives project. The ears pass lengthwise through this space and the husks thereof are cut into spiral strips by the knives, as will be described hereinafter.

The cutting mechanism hereinbefore described is driven from the shaft 18, the latter having, adjacent to the pulley 20, a sprocket wheel 34 which is connected by a chain 35 to a sprocket wheel 36 on a countershaft 37 supported in bearings 38 mounted on the table 13. On the countershaft 37 is a bevel gear 39 which is in mesh with a bevel gear 40 on a shaft 41 supported in bearing brackets 42 carried by the housing 26. On the shaft 41 is a spur gear 43 which meshes with an idler spur gear 44. On the outside of the cylinder 27 is a circular rack 45 which is in mesh with the gear 44. The housing 26 carries a bracket 46 which supports the gear 44.

A means is provided for feeding the ears past the knives 30, said means comprising pairs of grooved feed rollers 47 located adjacent to the respective ends of the cylinder 27. The members of the respective pairs of feed rollers are yieldingly pressed toward each other by mounting the shafts 48 thereof in bearing blocks 49 which are slidably mounted in slotted supports 50 and backed by springs 51. The housing 26 carries the supports 50 and also carries nuts 52 which are provided with screws 53 for adjusting the tension of the springs 51. The sides of the housing 26 carrying the supports 50 have openings in which the latter are mounted. The feed rollers yield to allow ears of different diameters to pass therebetween, and the rollers are so spaced that the ears are gripped when placed therebetween, whereby they are fed forward.

The following drive gear for the feed rollers 47 is provided: On one end of the shafts of the rollers are sprocket wheels 54 which are connected by chains 55, a driving connection being thus provided between the respective members of the top and bottom pairs of rollers. On the other end of the shafts of the top rollers are sprocket wheels 56 which are connected by chains 57 to sprocket wheels 58 on shafts 59, and on said shafts 59 are intermeshing spur gears 60. One of these spur gears meshes with a pinion 61 on a shaft 62 supported in a bearing mounted on the housing 26. On the shaft 62 is a pulley 63 which is connected by a crossed belt 64 to a pulley 65 on the countershaft 37.

A short distance below the bottom feed rollers 47 are located husk strippers in the form of two pairs of cylindrical rotary brushes 66 set close together so that when the ears pass therebetween, the husks are stripped or brushed off. The brushes are set so that their axes are parallel to the axis of the cylinder 27, or at a right angle to the axes of the feed rollers.

The stripper brushes 66 are mounted on shafts 67 which are supported in bearing brackets 68 on the blocks 49 which support the shafts 48 of the bottom feed rollers 47. The brushes are therefore also free to yield to allow ears of different diameters to pass therebetween. The brushes are driven from the aforesaid shafts 48 by bevel gears 69 thereon and meshing with bevel gears 70 on the brush shafts 67.

At the upper or entrance end of the housing 26 are spring-hinged wings 71 which extend convergingly downward and direct the ears to the upper feed rollers 47. The bottom of the housing 26 is open and located above an inclined chute 72 down which the ears slide to a suitable receptacle (not shown). Near its lower end, the chute is perforated, as indicated at 73, and below this portion of the chute is mounted a hopper 74. Any grains of corn which may drop off the ears pass through the perforations 73 and into the hopper 74, a bag or other suitable receptacle being hung thereon to receive the grains.

Mounted so as to discharge a blast of air over the upper or receiving end of the chute 72, is the discharge mouth 75 of a casing 76 inclosing a fan 77. At the upper end of the chute 72 is located the flared mouth 78 of a conveyer spout 79. The husks are blown into this spout and delivered to the binder to be tied up with the stalks. The fan 77 is driven by a crossed belt 80 from a pulley 81 on the countershaft 37.

At 82 is shown in conventional form an ordinary mechanism for forming the stalks into bundles and tying the same. As this mechanism is well known, it need not be described in detail. The bundle-forming and tying mechanism is driven from the shaft 37 by a chain 83, and associated with said mechanism is an inclined platform 84 on which the stalks are thrown and down which the tied bundles slide.

The operation of the machine may be summarized as follows: The corn stalks lying on the table 14 are taken up, one after the other, and the operator presents the butt ends of the ears to the cutter 17. The ears are severed at the point where the husks join the cob, which leaves the husks simply wrapped on the ear and unconnected at the butt. The ears are now dropped into the chute 25 down which they slide and drop into the hopper formed by the wings 71, which rights the ears and presents them endwise to the top feed rollers 47, one after the other. Each ear is grasped by the feed rollers and carried downward into the cylindrical space described by the knives 30. As the ear is traveling in the direction of its length, and the knives 30 are revolving around the ear, it will be seen that two parallel, spiral cuts are made in the husk by the knives 30, and the husk is cut into a spiral ribbon. When the ear reaches the bottom feed rollers 47 it is gripped thereby and fed down between the brushes 66, and the latter strip or brush off the ribbon of husk clinging to the ear, the silk also being taken off. The distance between the upper and lower feed rollers corresponds to the length of the average sized ears, so that the ear is urged forward through the cutter during the entire cutting operation. After passing the brushes, the husked ears and the husks drop on the chute 72. The ears slide down the chute to the receptacle designed to receive them, and the husks are blown by the fan 77 into the conveyer 79. The stalks, after the ears are severed therefrom, are thrown on the platform 84 and tied into bundles by the mechanism 82. It will be noted that the knives 30 are set obliquely to the line of travel of the ears, which makes a clean cut through the husks. The brushes are set parallel to the axis of the cutter, and the ears pass down lengthwise between the brushes.

I claim:

1. In a corn husking machine, means for severing the husks at their connection with the cob, a hollow revoluble husks cutter having knives arranged to cut radially and spirally, means for feeding the ears lengthwise through the cutter and parallel to its axis, and means for stripping the cut husks off the ears.

2. In a corn husking machine, means for severing the husks at their connection with the cob, a hollow revoluble husks cutter, husks-stripping rollers adjacent to the outlet end of the cutter, said rollers being set with their axes parallel to the axis of the cutter, and means for feeding the ears lengthwise through the cutter and between the stripping rollers.

3. In a corn husking machine, means for severing the husks at their connection with the cob, a rotary cylinder, shanks pivotally mounted in the cylinder to swing transversely thereof, husks-cutting knives arranged to cut radially and spirally carried by the shanks and arranged in a circle, means for feeding the ears lengthwise through the circle of knives, and means for stripping the cut husks off the ears.

4. In a corn husking machine, means for severing the husks at their connection with the cob, a rotary cylinder, shanks pivotally mounted in the cylinder to swing transversely thereof, the shanks at the entrance end of the cylinder being beveled to form a flared passageway, husk-cutting knives carried by the shanks and arranged in a circle, means for feeding the ears lengthwise through the circle of knives, and means for stripping the cut husks off the ears.

5. In a corn husking machine, means for severing the husks at their connection with the cob, a rotary cylinder, shanks pivotally mounted in the cylinder to swing transversely thereof, husk-cutting knives carried by the shanks and arranged in a circle and arranged to cut radially and spirally, means for feeding the ears lengthwise through the circle of knives, resilient means engaging the shanks for holding the knives yieldingly in cutting contact with the ears, and means for stripping the cut husks off the ears.

6. In a corn-husking machine, means for severing the husks at their connection with the cob, a circular series of husk-cutting knives, a rotary support for the knives, means for feeding the ears lengthwise through the circle of knives, said knives being set oblique to the line of travel of the ears to cut radially and spirally, and means for stripping the cut husks off the ears.

7. In a corn husking machine, means for severing the husks at their connection with the cob, a hollow revoluble husk-cutter having knives thereon, means for feeding the ears lengthwise through the cutter and parallel to its axis, the knives of the cutter being set oblique to the line of travel of the ears to cut radially and spirally, and means for stripping the cut husks off the ears.

8. In a corn husking machine, means for severing the husks at their connection with the cob, a hollow revoluble husk-cutter having knives arranged to cut radially and spirally, means for feeding the ears lengthwise through the cutter and parallel to its axis, means for stripping the cut husks off the ears, and a feed hopper adjacent to the feeding means at the entrance end of the cutter, said hopper having yielding walls.

9. In a corn husking machine, a rotary knife support consisting of a hollow cylinder, yielding members mounted in said support and having transverse knives thereon located in different planes, and means for advancing an unhusked ear of corn through said cylinder and in contact with said knives.

In testimony whereof I affix my signature in presence of two witnesses.

SOLOMON GERMAN.

Witnesses:
HOWARD D. ADAMS,
E. WALTON BREWINGTON.

Copies of this patent may be obtained for five cents each, by addressing the "Commissioner of Patents, Washington, D. C."